United States Patent
Fan et al.

(10) Patent No.: US 7,471,794 B2
(45) Date of Patent: Dec. 30, 2008

(54) NETWORK LOCK METHOD AND RELATED APPARATUS WITH CIPHERED NETWORK LOCK AND INERASABLE DECIPHERING KEY

(75) Inventors: Chen-Huang Fan, Miao-Li Hsien (TW); Ben-Chuan Du, Hsin-Tien (TW); Yi-Wen Cheng, Taipei (TW)

(73) Assignee: Qisda Corporation, Taoyuan County (TW)

( * ) Notice: Subject to any disclaimer, the term of this patent is extended or adjusted under 35 U.S.C. 154(b) by 829 days.

(21) Appl. No.: 10/708,949

(22) Filed: Apr. 2, 2004

(65) Prior Publication Data
US 2005/0053241 A1    Mar. 10, 2005

(30) Foreign Application Priority Data
Apr. 4, 2003    (TW) ............... 92107825 A

(51) Int. Cl.
    *H04K 1/00*    (2006.01)
(52) U.S. Cl. ...................... 380/270; 713/182
(58) Field of Classification Search ............. 713/182; 380/270
See application file for complete search history.

(56) References Cited

U.S. PATENT DOCUMENTS

| | | | | |
|---|---|---|---|---|
| 4,278,837 A * | 7/1981 | Best ........................... 713/190 |
| 5,077,790 A * | 12/1991 | D'Amico et al. ............. 380/249 |
| 5,557,679 A * | 9/1996 | Julin et al. ................... 380/249 |
| 6,144,949 A * | 11/2000 | Harris .......................... 705/38 |
| 6,308,268 B1 * | 10/2001 | Audebert ..................... 713/182 |
| 6,367,019 B1 * | 4/2002 | Ansell et al. ................. 726/26 |
| 6,484,260 B1 * | 11/2002 | Scott et al. .................. 713/186 |
| 6,721,886 B1 * | 4/2004 | Uskela ........................ 713/168 |
| 6,799,155 B1 * | 9/2004 | Lindemann et al. ........... 703/24 |
| 6,880,079 B2 * | 4/2005 | Kefford et al. ............... 713/155 |
| 6,883,052 B2 * | 4/2005 | Dorenbeck et al. .......... 710/200 |
| 6,930,987 B1 * | 8/2005 | Fukuda et al. ............... 370/328 |
| 7,010,694 B2 * | 3/2006 | Vatanen ....................... 713/176 |
| 7,069,585 B1 * | 6/2006 | Chess et al. .................... 726/9 |
| 7,107,620 B2 * | 9/2006 | Haverinen et al. ............ 726/29 |
| 7,114,175 B2 * | 9/2006 | Lahteenmaki .................. 726/4 |
| 7,131,004 B1 * | 10/2006 | Lyle ........................... 713/169 |
| 7,151,922 B2 * | 12/2006 | Sashihara et al. ......... 455/412.2 |
| 7,231,372 B1 * | 6/2007 | Prange et al. ................. 705/67 |
| 7,231,531 B2 * | 6/2007 | Cupps et al. ................. 713/322 |
| 7,392,385 B2 * | 6/2008 | Yoshimura et al. .......... 713/168 |
| 2002/0012433 A1 * | 1/2002 | Haverinen et al. .......... 380/247 |
| 2002/0021809 A1 * | 2/2002 | Salo et al. .................... 380/239 |
| 2002/0034301 A1 * | 3/2002 | Andersson ................... 380/270 |
| 2002/0035687 A1 * | 3/2002 | Skantze ....................... 713/168 |
| 2002/0056044 A1 * | 5/2002 | Andersson ................... 713/189 |
| 2002/0059530 A1 * | 5/2002 | Talvitie ....................... 713/201 |

(Continued)

*Primary Examiner*—Nasser G Moazzami
*Assistant Examiner*—David Garcia Cervetti

(57) ABSTRACT

The method includes: associating different cell phones to different enciphering and deciphering keys of an asymmetric encryption algorithm. Access information of the network lock corresponding to the cell phone is enciphered by the corresponding enciphering key. Then, the enciphered network lock is stored in the cell phone, and the corresponding deciphering key is recorded in an inerasable memory of the cell phone. The original plaintext access information of the network lock and the enciphering key is stored only in a service provider of the communication network. When the cell phone tries to access the communication network, it deciphers the enciphered network lock using the deciphering key stored in the inerasable memory to verify the network lock of the cell phone.

20 Claims, 3 Drawing Sheets

U.S. PATENT DOCUMENTS

| | | | |
|---|---|---|---|
| 2002/0083320 A1* | 6/2002 | Vatanen | 713/168 |
| 2002/0089890 A1* | 7/2002 | Fibranz et al. | 365/230.03 |
| 2002/0094086 A1* | 7/2002 | Grassmann et al. | 380/264 |
| 2002/0097876 A1* | 7/2002 | Harrison | 380/270 |
| 2002/0150243 A1* | 10/2002 | Craft et al. | 380/201 |
| 2002/0169958 A1* | 11/2002 | Nyman et al. | 713/168 |
| 2003/0021413 A1* | 1/2003 | Kiiveri et al. | 380/247 |
| 2003/0021418 A1* | 1/2003 | Arakawa et al. | 380/277 |
| 2003/0028805 A1* | 2/2003 | Lahteenmaki | 713/201 |
| 2003/0070084 A1* | 4/2003 | Satomaa et al. | 713/200 |
| 2003/0079124 A1* | 4/2003 | Serebrennikov | 713/156 |
| 2003/0114191 A1* | 6/2003 | Nishimura | 455/557 |
| 2003/0147532 A1* | 8/2003 | Hakkarainen et al. | 380/239 |
| 2003/0150915 A1* | 8/2003 | Reece | 235/449 |
| 2003/0158807 A1* | 8/2003 | Takeshi | 705/37 |
| 2003/0159054 A1* | 8/2003 | Fauble et al. | 713/189 |
| 2003/0172278 A1* | 9/2003 | Farnham et al. | 713/176 |
| 2003/0204726 A1* | 10/2003 | Kefford et al. | 713/171 |
| 2003/0210789 A1* | 11/2003 | Farnham et al. | 380/270 |
| 2003/0236985 A1* | 12/2003 | Ruuth | 713/173 |
| 2004/0013269 A1* | 1/2004 | Du et al. | 380/284 |
| 2004/0102987 A1* | 5/2004 | Takahashi et al. | 705/1 |
| 2004/0117623 A1* | 6/2004 | Kalogridis et al. | 713/165 |
| 2004/0136529 A1* | 7/2004 | Rhelimi et al. | 380/44 |
| 2004/0158716 A1* | 8/2004 | Turtiainen et al. | 713/172 |
| 2004/0240671 A1* | 12/2004 | Hu et al. | 380/277 |
| 2005/0069137 A1* | 3/2005 | Landrock | 380/278 |
| 2005/0086496 A1* | 4/2005 | Sandberg | 713/185 |
| 2005/0120225 A1* | 6/2005 | Kirsch et al. | 713/183 |
| 2005/0147249 A1* | 7/2005 | Gustavsson et al. | 380/247 |
| 2005/0222949 A1* | 10/2005 | Inotay et al. | 705/40 |
| 2007/0206786 A1* | 9/2007 | Chakraborty | 380/30 |
| 2008/0049933 A1* | 2/2008 | Kuroda | 380/201 |

* cited by examiner

NETWORK LOCK METHOD AND RELATED APPARATUS WITH CIPHERED NETWORK LOCK AND INERASABLE DECIPHERING KEY

BACKGROUND OF INVENTION

1. Field of the Invention

The present invention relates to a network lock method and a related apparatus, and more particularly, to a network lock method and a related apparatus by ciphered network lock and inerasable deciphering key.

2. Description of the Prior Art

In modern society, wireless communication networks have become one of the most important ways of communicating with people and exchanging information. Everyone can take advantage of the service of a wireless communication network easily and enjoy the power of accessing worldwide information anywhere and anytime via a convenient cell phone. For permanently maintaining the market and managing communication networks, it has become important to the information industry to improve the quality of communication services, maintain the communication order of communication networks, and ensure the rights of the subscribers of communication networks.

In general, service of wireless communication is provided by a service provider. Cell phone subscribers pay fees for rights of access to the communication service. To protect the rights of legal subscribers, when a cell phone user uses the communication service, the cell phone determines whether the user is a legal subscriber by a network lock determination mechanism. If the user is not a legal subscriber, the cell phone is restricted to access the communication network directly. Please refer to FIG. 1. FIG. 1 is a block diagram of a conventional communication network comprising communication devices 12 and 13, and a service provider 28. The cell phone 12 is taken for example to illustrate the communication device in a conventional communication system 10. There are a wireless signal transceiver module 14, a processor 16 controlling functions of cell phone 12, a data memory 20 (a non-volatile memory such as a flash memory), a subscriber identification module card (SIM card) 24 capable of identifying the subscriber, a microphone 18A capable of transforming acoustic waves to electronic signals, a speaker 18B, and a man machine interface (MMI) 21. The man machine interface 21 may comprise a keypad, a display, a vibrator, etc., so that the user of the cell phone 12 is able to control the cell phone 12 and monitor the operation of the cell phone 12 via the man machine interface 21. For the service provider 28, there is a base station 29 capable of providing communication service by transmitting and receiving wireless signals among cell phones. For instance, the acoustic waves of the users voice at the cell phone 12 are received and transformed into electronic signals by the microphone 18A, encoded appropriately by the processor 16, then modulated into radio frequency (RF) signals in the transceiver module 14 and wirelessly emitted to the base station 29. The base station 29 wirelessly transmits the signals received from the cell phone 12 to the cell phone 13, so that the user of the cell phone 13 is able to receive the message from the user of the cell phone 12. For the acoustic message transmitted by the cell phone 13 to the cell phone 12, the base station 29 receives it from the cell phone 13 and then wirelessly transmits it to the cell phone 12. The cell phone 12 receives the wireless signals at the transceiver module 14 and demodulates them to a base band signal, then decodes them appropriately with the processor 16 and transmits them to the speaker 18B to transform them into acoustic waves so that the user of the cell phone 12 can hear them. In this manner, the user of the cell phone 12 and the user of the cell phone 13 are able to communicate via the communication service provided by the service provider 28.

However, as mentioned, to protect the rights of legal subscribers, verification of the network lock is carried out automatically in the cell phone 12 to determine whether the user of the cell phone 12 is permitted to use the service of the communication network 10. Typically, there is a subscriber identification number 26 stored in the SIM card 24 in the cell phone 12 to represent the identification of the user of the cell phone 12. Generally speaking, the SIM card 24 is detachably connected to the cell phone 12. When a user proposes to use the service of the communication network 10 via the cell phone 12, he inserts the SIM card 24 to the cell phone 12 so that the cell phone 12 is able to identify the subscriber. Corresponding to the subscriber identification number 26 stored in the SIM card 24, there are a device identification number 23 and access information 22 of the verification procedure stored in the data memory 20. The device identification number 23 is a unique identification number of the cell phone (such as an IMEI, International Mobile Equipment Identity). In other words, the device identification numbers of different cell phones are different. Access information 22 is adapted to record the status of the network lock of the cell phone 12. The network lock is adapted for defining what subscriber identification numbers are permitted to utilize the service of the communication network 10. The status of the network lock of the cell phone 12 and the permitted subscriber identification numbers are stored in access information 22. For example, when values of some fields of the subscriber identification number 26 are within a predetermined range, the cell phone 12 accepts the subscriber identification number 26 as a legal subscriber identification number. The predetermined range is recorded in the access information 22. In the prior art, when the verification is carried out in the cell phone 12, the processor 16 loads and reads the access information 22 in the data memory 20, and determines whether the network lock of the cell phone 12 is turned on accordingly. If the status of the network lock is recorded as on in the access information 22, the processor 16 further checks whether the subscriber identification number 26 recorded in the SIM card 24 is among the legal subscriber identification numbers recorded in the access information 22. If the subscriber identification number 26 is recognized as a legal subscriber identification number, for example, as previously mentioned, the values of some fields of the subscriber identification number 26 are within the recorded predetermined range, the processor 16 determines the owner of the SIM card 24 is a legal subscriber of the communication network 10, and allows the cell phone 12 to proceed with following procedures so that the user of the cell phone 12, that is, the owner of the SIM card 24, is able to utilize the service of the communication network 10 via the cell phone 12. On the contrary, if the processor 16 finds the subscriber identification number 26 in the SIM card 24 is beyond the range of legal subscriber identification numbers recorded in the access information 22, the processor 16 determines the owner of the SIM card 24 is not a legal subscriber of the communication network 10, and prevents access by the cell phone 12 to the communication network 10. On the other hand, if the processor 16 finds the status of the network lock stored in the access information 22 is off when proceeding with the verification, the processor 16 does not check the subscriber identification number 26, but allows the owner of the SIM card 24 to utilize the service of the communication network 10 via the cell phone 12 directly.

To sum up, the network lock of the prior art determines whether the owner of the SIM card 24 is permitted to utilize the service of the communication network 10 via the cell phone 12 according to the access information 22 stored in the data memory 20. However, the conventional method carries the risk that the network lock be broken by illegal users. For example, when an illegal user wants to break the network lock of the cell phone 12, the illegal user can obtain the access information of another cell phone of which the network lock is turned off. Since the network lock is off in this cell phone, the status of the network lock is stored as off in the access information. Therefore, the access information can be utilized to break the network lock. For example, even when the network lock of the cell phone 12 is recorded as on in the access information 22, the illegal user can overwrite the original access information 22 with unsanctioned access information in the data memory 20, replacing the original access information 22 with the unsanctioned access information. When the cell phone 12 proceeds with the verification, it follows the unsanctioned access information and does not turn on the network lock, and hence the network lock of the cell phone 12 is broken. Even in the situation that the subscriber identification number 26 on the SIM card 24 is not a legal subscriber identification number, the owner of the SIM card 24 is able to access the service of the communication network 10 via the cell phone 12 illegally. For the convenience in maintenance and testing, there are predetermined maintenance junctions in the data memory 20 of the cell phone 12. Illegal users can take advantage of these predetermined maintenance junctions to write the breaking access information into the data memory 20 and overwrite the original access information 22 with a special data tool, such as JTAG tool, breaking the network lock of the cell phone 12. More seriously, illegal users can rewrite the access information 22 directly. For example, one can break the network lock of the cell phone 12 by rewriting the status of the network lock in the access information 22 to off. In addition, illegal users can delete the access information 22. Generally, in the cell phone 12 of the prior art, when the processor 16 finds that there is no access information in the data memory 20, the processor 16 proceeds with the network lock verification according to a predetermined access information, and the network lock usually is not turned on in this predetermined access information. Therefore, the network lock of the cell phone 12 is broken by the illegal users. Once the network lock is illegally broken, operations of the communication network 10 and the rights of the service provider and the legal subscribers (the owners of legal SIM cards) are affected.

SUMMARY OF INVENTION

It is therefore a primary objective of the claimed invention to provide a network lock method and a related apparatus with ciphered network lock and inerasable deciphering key.

In the structure of the conventional network lock, the processor in the cell phone carries out the network lock verification according to the status of the network lock recorded in the access information in the data memory. Once the access information is overwritten or falsified, the network lock is broken, and operations of the communication network and the rights of legal subscribers are affected.

In the present invention, an asymmetric cryptography algorithm is utilized to encipher the access information of network locks of different cell phones into ciphertext access information according to different enciphering keys. The ciphertext access information of each cell phone is stored in each cell phone, and the corresponding deciphering key is recorded in an inerasable memory in each cell phone. The corresponding enciphering key of each cell phone is reserved in the database of the service provider only, wherein the inerasable memory is a one-time programmable memory of a lockable area in a flash memory so that the recorded deciphering key cannot be rewritten. When a cell phone carries out network lock verification, the cell phone deciphers the ciphertext access information in the data memory into plaintext access information according to the deciphering key in the inerasable memory, and proceeds with the network lock verification according to the status of the network lock recorded in the plaintext access information. If illegal users copy ciphertext access information of another cell phone B and write it into the cell phone A attempting to break the network lock of the cell phone A, the cell phone A cannot resolve the correct plaintext access information when deciphering the ciphertext access information because the deciphering keys of the cell phone A and B are different. The cell phone A can therefore determine the network lock is broken and stop the access to the communication network to prevent the security of the communication network from being violated. The access information in each cell phone is ciphertext hence illegal users are prevented from changing the access information directly to break the network lock. Since the enciphering key is not exposed in the cell phone or in the communication network, even if illegal users are capable of falsifying the plaintext access information, the falsified plaintext access information cannot be enciphered into the correct ciphertext access information that can be deciphered by the corresponding deciphering key. Besides, when the service provider updates access information of the network lock in a cell phone, the service provider can determine the corresponding enciphering key of the cell phone in the database and utilize it to encipher the updated plaintext access information into new ciphertext access information, and then store the updated ciphertext access information in the data memory of the cell phone. In this manner, the present invention ensures the safety of the network lock, and further protects the security of the communication network and the rights of subscribers.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
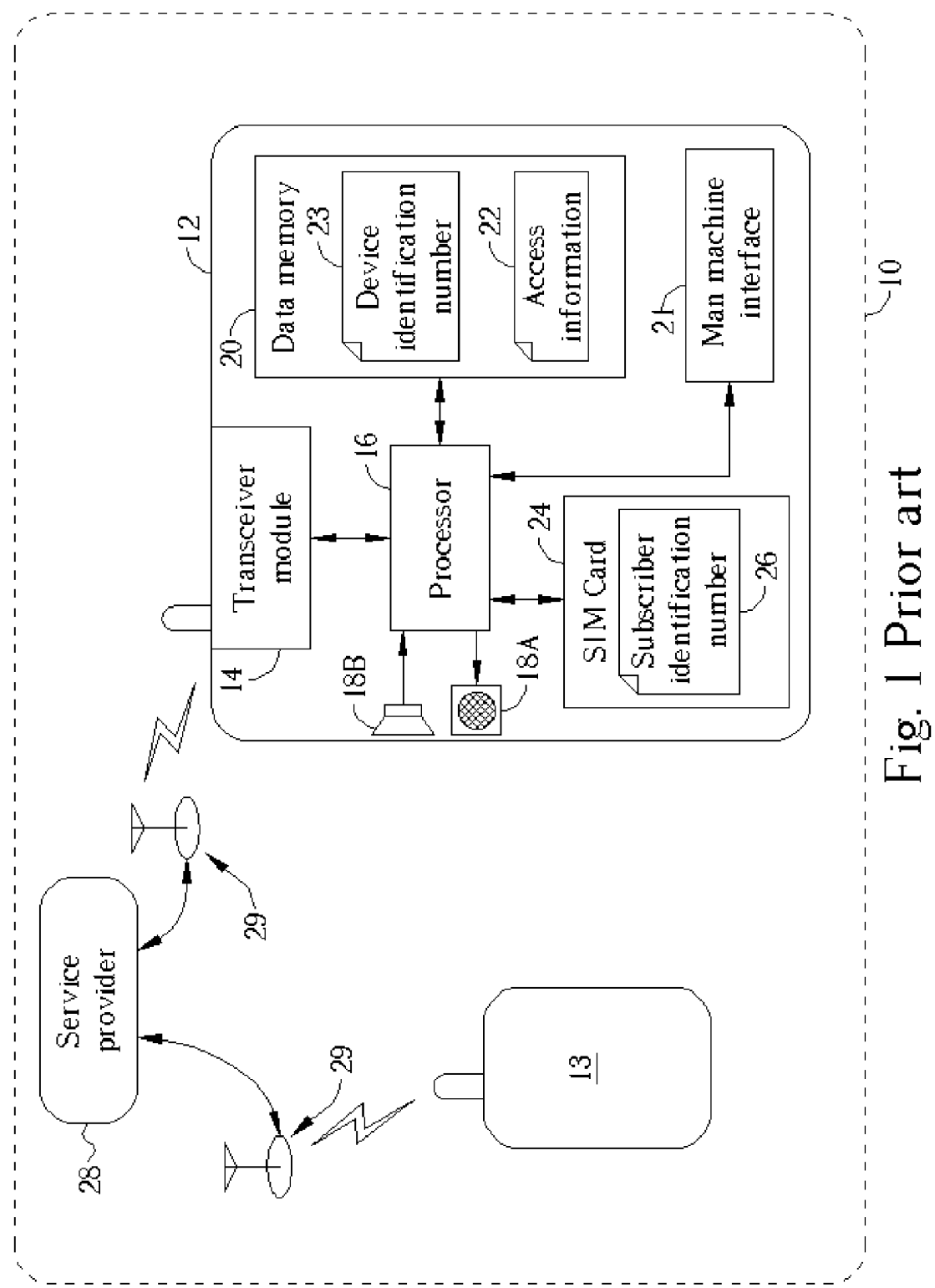
FIG. 1 is a block diagram of a conventional communication network comprising communication devices and a service provider.
Figure 2:
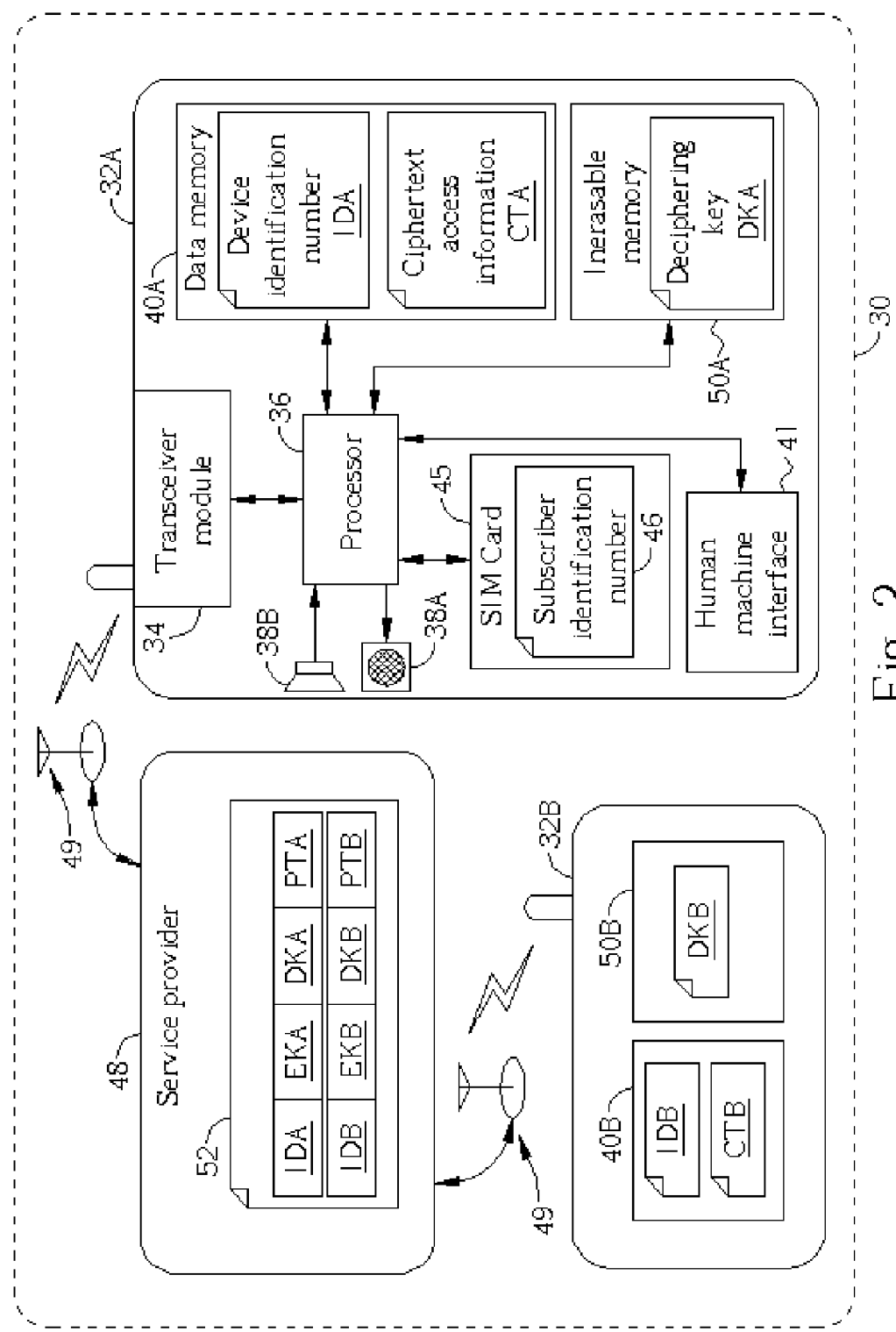
FIG. 2 is a block diagram of a present invention communication network comprising communication devices and a service provider.

Please refer to FIG. 2. FIG. 2 is a block diagram of a present invention communication network 30. The communication network 30 may be a wireless communication network providing communication service through a service provider 48 to each user via each cell phone (represented by cell phone 32A and 32B in FIG. 2). The cell phone 32A is taken for example to introduce the communication device of the present invention communication system 30. The cell phone 12 comprises a wireless signal transceiver module 34, a processor 36 capable of controlling functions of cell phone 32A, a microphone 38A capable of transforming acoustic waves to electronic signals, a speaker 38B capable of transforming electronic signals to acoustic waves, a non-volatile memory 40A, a non-volatile inerasable memory 50A, a SIM card 45 detachably connected to the cell phone 32A, and a man machine interface 41. The man machine interface 21 may comprise a keypad, a display, a vibrator, etc., so that the user of the cell phone 32A is able to control the cell phone 32A and monitor the operation of the cell phone 32A via the man machine interface 41. In the service provider 48, there is a base station 49 capable of providing communication service and transmitting and receiving wireless signals among cell phones. For instance, the acoustic waves of the voice of the user of the cell phone 32A can be received and transformed into electronic signals by the microphone 38A, encoded appropriately by the processor 36, modulated into radio frequency signals in the transceiver module 34, and wirelessly emitted to the base station 49. After the service provider 48 receives the wireless electronic signals emitted by the cell phone 32A, the base station 49 transmits the signals wirelessly to the cell phone 32B. As for the message transmitted by the cell phone 32B to the cell phone 32A, the service provider 48 receives it from the cell phone 32B and then transmits it to the cell phone 32A wirelessly.

However, as mentioned, to protect the security of the communication network 30 and the rights of legal subscribers, a verification is carried out automatically in the cell phone 32A to determine whether the user of the cell phone 32A is permitted to utilize the service of the communication network 30 before the cell phone 32A uses the service of the communication network 30. The user has to insert the SIM card 45 to the cell phone 32A so that the cell phone 32 is able to identify the subscriber according to the subscriber identification number 46 recorded in the SIM card 45 through the network lock mechanism. For implementing the verification in the present invention, in the communication network 30, the cell phone includes firmware and ciphertext access information besides the device identification number stored in the data memory, and further includes an inerasable memory for storing a deciphering key. As illustrated in FIG. 2, a device identification number IDA and ciphertext access information CTA are stored in the data memory 40A of the cell phone 32A, and a deciphering key DKA is stored in the inerasable memory 50A. Following the same rule, a device identification number IDB of the cell phone 32B and ciphertext access information CTB of the cell phone 32B are stored in the data memory 40B of the cell phone 32B, and a deciphering key DKB of the cell phone 32B is stored in the inerasable memory 50B. (The basic structure of the cell phone 32B is similar to the cell phone 32B. Therefore, some parts of the structure of the cell phone 32B, such as the transceiver module and the processor, are omitted in FIG. 2 for conciseness). As mentioned, the corresponding device identification number of a cell phone, such as the IMEI identification number, is utilized to identify the cell phone, so the device identification numbers of different cell phones are different. For instance, the device identification number IDA of the cell phone 32A is different from the device identification number IDB of the cell phone 32B. Furthermore, in the communication network 30, the deciphering keys and the ciphertext access information stored in different cell phones are not the same. For example, in FIG. 2, the deciphering keys DKA and DKB and the ciphertext access information CTA and CTB of the cell phones 32A and 32B respectively are different from each other. The deciphering key is stored in the inerasable memory and is hence read-only. In implementation, the inerasable memory may be a one-time programmable memory. In some modern flash memories, it is possible to reserve a part of the memory as a lockable memory area. Similarly, the data cannot be overwritten once the data is written in the lockable memory area. Oppositely, the data stored outside the lockable memory area in the same flash memory can be rewritten and erased. Utilizing this kind of flash memory, the data memory and the inerasable memory can be implemented in the same flash memory, wherein the lockable memory area is adapted as the inerasable memory to record the deciphering key and the not-lockable memory area as the data memory to record the firmware of the cell phone, the device identification number, the ciphertext access information, etc.

The service provider 48 includes a database 52 capable of recording the corresponding device identification numbers, enciphering keys, and plaintext access information of the cell phones. The database 52 can also record the corresponding deciphering keys of the cell phones selectivity. For instance, in FIG. 2, the database 52 records the device identification number IDA of the cell phone 32A, and takes the device identification number IDA as an index of the records of the corresponding enciphering key EKA, the deciphering key DKA, and plaintext access information PTA of the cell phone 32A. Similarly, for the cell phone 32B, the database 52 takes the device identification number IDB as an index of the records of the corresponding enciphering key EKB, the deciphering key DKB, and plaintext access information PTB. The plaintext access information corresponding to each cell phone is utilized to record the access information of the network lock, such as whether the network lock is turned on, the subscriber identification numbers which are accepted by the network lock, and so on.

Figure 3:
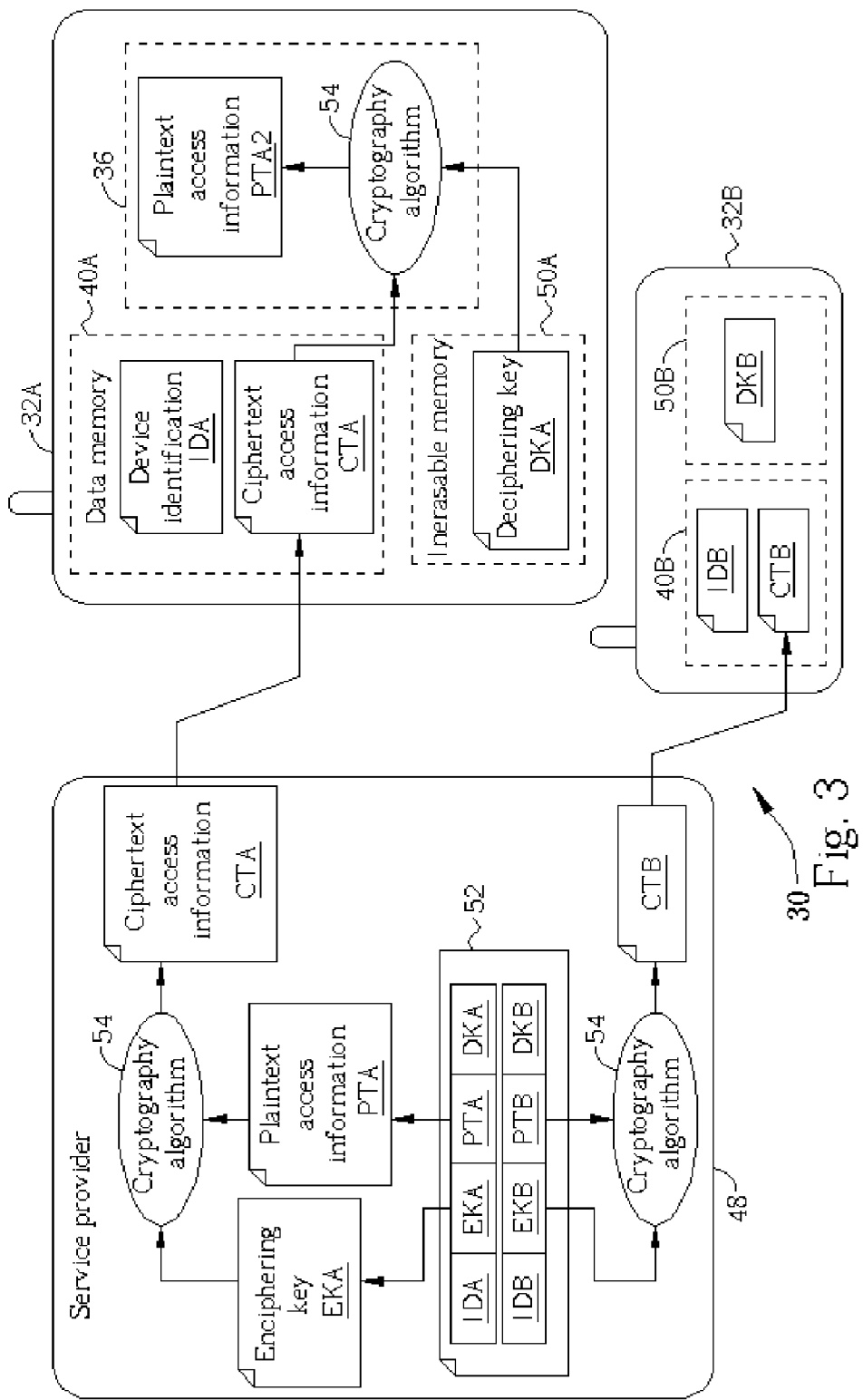
FIG. 3 is another block diagram of a present invention communication network comprising communication devices and a service provider.

The principle of the network lock in the present invention is described as follows. Access information of the network lock in each cell phone is enciphered to ciphertext access information in the data memory according to the enciphering key corresponding to the cell phone by an asymmetric cryptography algorithm. When the cell phone carries out the verification before accessing the communication service, the processor of the cell phone deciphers the ciphertext access information to plaintext access information according to the deciphering key stored in the inerasable memory, then determines whether the user of the cell phone is a legal subscriber according to the information recorded in the plaintext access information, such as whether the network lock is on or off and the range of the legal subscriber identification number, to implement the network lock mechanism. As for the detailed implementation of the present invention, please refer to FIG. 3 and FIG. 2. FIG. 3 is another block diagram of the present invention communication network operating under the network lock mechanism. For the convenience of illustration, some devices of the cell phone 32A and 32B are omitted in FIG. 3.

As mentioned, in the present invention, a predetermined asymmetric cryptography algorithm is utilized to encipher plaintext access information and to decipher ciphertext access information. In the asymmetric cryptography algorithm, the enciphering key for enciphering plaintext to ciphertext and the corresponding deciphering key for deciphering the ciphertext to the original plaintext are not the same. In other words, when plaintext is enciphered to ciphertext by an enciphering key, the ciphertext cannot be deciphered to the original plaintext by the same enciphering key, but has to be deciphered to the original plaintext by a specific corresponding deciphering key. Similarly, the result of the plaintext enciphered by the deciphering key is not equal to that of the plaintext enciphered by the enciphering key. According to the cryptography algorithm, a plurality of different enciphering keys and the corresponding deciphering keys are calculated in the present invention. In the present invention, an enciphering key and a corresponding deciphering key designated to a cell phone together with designated to a cell phone are recorded in the database 52 in the service provider 48, and we can take advantage of the device identification number of each cell phone as an index of the above recorded data. As illustrated in FIG. 3, the service provider 48 generates the enciphering keys EKA and EKB, and the corresponding deciphering keys DKA and DKB according to the asymmetric cryptography algorithm 54. Since enciphering keys EKA and EKB are different and the cryptography algorithm 54 is asymmetric, EKA, EKB, DKA, and DKB are all different. When the cell phone 32A leaves the factory, it is given a specifically exclusive device identification number IDA. Then the service provider 48 distributes the enciphering key EKA and the deciphering key DKA to the cell phone 32A, and stores the EKA, DKA and the plaintext access information PTA corresponding to the status of the network lock of the cell phone 32A in the database 52 utilizing the device identification number IDA of the cell phone 32A as an index. Likewise, for the cell phone 32B which is given a specifically exclusive device identification number IDB, the service provider 48 distributes the enciphering key EKB and the deciphering key DKB to the cell phone 32B, and stores the EKB, DKB and the plaintext access information PTB corresponding to the network lock of the cell phone 32B in the database 52 utilizing the device identification number IDB of the cell phone 32B as an index.

When the cell phone leaves the factory, the service provider 48 not only distributes the unique enciphering key and the corresponding deciphering key to each cell phone but also writes the deciphering key into the inerasable memory of each cell phone. The deciphering key recorded in the cell phone cannot be rewritten after the cell phone leaves the factory. As illustrated in FIG. 3, the deciphering key DKA of the cell phone 32A is recorded in the inerasable memory 50A, and the deciphering key DKB of the cell phone 32B is recorded in the inerasable memory 50B. Besides, the status of the network lock of each cell phone is recorded in the corresponding plaintext access information in the database 52. However, in the present invention, the status of the network lock of each cell phone is not stored in the plaintext access information in each cell phone directly, but in ciphertext access information that is enciphered from the original plaintext access information by the service provider 48 according to the enciphering key of each cell phone. In FIG. 3, the plaintext access information PTA and PTB of the cell phones 32A and 32B respectively are utilized to record the corresponding statuses of the cell phone network locks. For instance, the status of the network lock of the cell phone 32A is recorded in the plaintext access information PTA. As mentioned, the service provider 48 first enciphers the plaintext access information PTA to the ciphertext access information CTA according to the enciphering key EKA by the cryptography algorithm 54, then records the ciphertext access information CTA in the data memory 40A in the cell phone 32A. Likewise, the service provider 48 first enciphers the plaintext access information PTB to the ciphertext access information CTB according to the enciphering key EKB by the cryptography algorithm 54, then records the ciphertext access information CTB in the data memory 40B in the cell phone 32B. To conclude the above description, the enciphering key EKA and the deciphering key DKA and the plaintext access information PTA of the status of the network lock of the cell phone 32A are recorded when the cell phone 32A leaves the factory; meanwhile the deciphering key DKA is recorded in the inerasable memory 50A in the cell phone 32A, and the ciphertext access information CTA is recorded in the data memory 40A. Similarly, the enciphering key EKB and the deciphering key DKB and the plaintext access information PTB of the status of the network lock of the cell phone 32B are recorded when the cell phone 32B leaves the factory; meanwhile the deciphering key DKB is recorded in the inerasable memory 50B in the cell phone 32B, and the ciphertext access information CTB is recorded in the data memory 40A. Please note that under the construction of the present invention, the corresponding enciphering key and the network lock plaintext access information of each cell phone are recorded only in the database 52 of the service provider 48, and are not exposed in each cell phone. Only the corresponding ciphertext access information and the deciphering key are saved in each cell phone.

In the present invention, when the cell phone leaves the factory, the deciphering key and ciphertext access information corresponding to the cell phone are stored in the cell phone. As mentioned, when a user utilizes the service of the communication network 30 via a cell phone, the cell phone first carries out the verification of the network lock mechanism automatically to determine whether the user is a legal subscriber. At this moment, the processor of the cell phone deciphers the ciphertext access information stored in the data memory to plaintext access information according to the deciphering key stored in the inerasable memory by the cryptography algorithm 54, then determines whether the user is a legal subscriber by the status of the network lock recorded in the plaintext access information. For example, as illustrated in FIG. 3, when the cell phone 32A proceeds with the verification, the processor 36 of the cell phone 32A data memory 40A loads the ciphertext access information CTA and the deciphering key DKA from the inerasable memory 50A, and applies the cryptography algorithm 54 to decipher the ciphertext access information CTA to plaintext access information PTA2 according to the deciphering key DKA. Since the ciphertext access information CTA is enciphered from the plaintext access information PTA by the service provider 49 according to the enciphering key EKA of the cell phone 32A, and the deciphering key DKA stored in the inerasable memory 50A is corresponding to the enciphering key EKA, the plaintext access information PTA2 deciphered by the processor 36 of the cell phone 32A should equal the original plaintext access information PTA of the cell phone 32A. According to the status of the network lock recorded in the plaintext access information PTA2, the cell phone 32A is able to proceed with the verification. For instance, if the status of the network lock of the cell phone 32A recorded in the plaintext access information PTA2 is turned on, the processor 36 compares the subscriber identification number 46 in the SIM card 45 (please refer to FIG. 2) with the range of legal subscriber identification numbers recorded in the plaintext access information PTA2. If the subscriber identification number 46 conforms to the legal subscriber identification numbers, the processor 36 permits the user to access the communication service of communication network 30 via the cell phone 32A. No matter what the conclusion of the verification is, the plaintext access information PTA2 deciphered by the processor 36 is saved in the volatile memory area in the processor 36. After the processor 36 completes the verification, the plaintext access information PTA2 is released, not exposing in the non-volatile memories in the cell phone 32A, such as the data memory 40A.

The aforementioned network lock mechanism of the present invention is capable of protecting the network lock from being broken. In the prior art, illegal users overwrite the access information of the network lock stored in the cell phone with unsanctioned access information, or falsify the access information of the network lock stored in the cell phone directly, so that the cell phone of prior art is not able to determine the true status of the network lock when proceeding with the verification of the network lock. However, the aforementioned methods cannot break the network lock mechanism of the present invention. For instance, an illegal user who proposes to break the network lock of the cell phone 32A may load the ciphertext access information CTB into the cell phone 32B and copy it to the cell phone 32A to overwrite the original ciphertext access information CTA in the cell phone 32A. However, when the cell phone 32A proposes to determine the network lock and deciphers the ciphertext access information CTB in the data memory 40A according to the deciphering key DKA, since the enciphering key EKA is not the same as the enciphering key EKB, the processor 36 cannot decipher to the correct plaintext access information PTB. The deciphered the network lock of the cell phone 32A has been broken. To take advantage of the ciphertext access information CTB of the cell phone 32B to break the original network lock of the cell phone 32A, illegal users have to also replace the deciphering key DKA of the cell phone 32A with the deciphering key DKB of the cell phone 32B, then the cell phone 32A can take advantage of the deciphering key DKB to decipher the ciphertext access information CTB to plaintext access information with correct format. However, as mentioned, the deciphering key DKA of the cell phone 32A is stored in the inerasable memory 50A and cannot be replaced or falsified. Therefore, illegal users cannot break the network lock in the present invention. Besides, if the illegal users propose to break the network lock of cell phone 32A and falsify the ciphertext access information CTA in the data memory 40A directly, the plaintext access information PTA2 deciphered by the processor 36 then becomes meaningless data with the wrong format. The processor 36 can determine that the network lock of the cell phone 32A has been broken accordingly. To break the network lock of the cell phone 32A, illegal users have to encipher the broken plaintext access information to the broken ciphertext access information by the enciphering key EKA, then copy it to the data memory in the cell phone 32A. However, the enciphering key EKA of the cell phone 32A is kept in the service provider 48 of the communication network 30 only, and is not exposed in each cell phone, so illegal users cannot obtain the correct ciphertext access information meaning that they cannot break the network locks.

When the processor 36 of the cell phone 32A determines that the format of the deciphered plaintext access information PTA2 is not correct and determines the network lock is broken, meaning that the ciphertext access information CTA is replaced by unknown data, the processor 36 may stop the access of the cell phone 32A to the communication service and protect the security of the communication network 30. Besides, when the network lock is broken, the processor 32A may take advantage of the man machine interface (in FIG. 2) to further alert the user that the cell phone 32A needs to be verified with the service provider 48. The service provider 48 can determine the enciphering key EKA of the cell phone 32A in the database 52 according to the device identification number IDA, encipher the plaintext access information PTA to the ciphertext access information CTA with the cryptography algorithm 54 according to the enciphering key EKA, and rewrite the ciphertext access information CTA in the data memory 40A in the cell phone 32A to recover the network lock mechanism of the cell phone 32A. Of course, when the processor 36 determines that the network lock has been broken, the processor 36 can automatically alert the service provider 48 with its identification number IDA via the communication network 30, and ask the service provider 48 to resend the correct ciphertext access information CTA to the cell phone 32A via the communication network. The processor 40A then writes the correct ciphertext access information CTA into the data memory 40A automatically to recover the network lock mechanism of the cell phone 32A. Since the cell phone 32A only needs ciphertext access information CTA to recover the network lock mechanism, the enciphering key and the deciphering key of the cell phone 32A are not exposed in the wireless communication network even when the ciphertext access information CTA is transmitted via the wireless communication network. Furthermore, since the deciphering keys of different cell phones are different from one another, even when illegal users are able to intercept the ciphertext access information CTA, the ciphertext access information CTA cannot be utilized to break the network locks of other cell phones (such as the cell phone 32B). Moreover, when illegal users propose to break the network lock of the cell phone 32A by deleting the ciphertext access information CTA, the cell phone 32A can ask the service provider 48 to redistribute the ciphertext access information CTA to recover the original network lock mechanism and protect the network lock from being broken.

The present invention is capable of protecting the network lock mechanism even when there is a normal adjustment of the network lock. For example, if the service provider 48 adjusts the status of the network lock of the cell phone 32A voluntarily, such as by turning on the network lock of the cell phone 32A, the service provider 48 can update the plaintext access information PTA, and then encipher the updated plaintext access information PTA to new ciphertext access information CTA according to the enciphering key EKA of the cell phone 32A. Besides notifying the subscriber of the cell phone 32A to bring the cell phone 32A to the service provider 48 for writing the new ciphertext access information CTA into the cell phone 32A, the service provider 48 can transmit the new ciphertext access information CTA to the cell phone 32A via the wireless communication network 30 and let the processor 36 of the cell phone 32A write the new ciphertext access information CTA into the data memory 40A to replace the original ciphertext access information. This is not only convenient to the subscriber of the cell phone 32A, but also relatively safe for the access information, that is, the risk of exposure when transmitting is low, because the access information has already been enciphered to the ciphertext access information. Besides the status of the network lock, the service provider records the device identification number corresponding to the cell phone in the plaintext access information, so that the enciphered ciphertext access information includes the device identification number of the cell phone, too. When the cell phone proceeds with the verification and deciphers the ciphertext access information to the plaintext access information, it determines whether the network lock is broken by the format of the plaintext access information, and it can double check it by comparing the deciphered device identification number and the real device identification number of the cell phone.

In the prior art, the access information of the network lock is stored in plaintext in the cell phone and is easy to be overwritten or falsified by illegal users, therefore the network lock is easily broken. By contrast, the present invention distributes a unique set of enciphering key and deciphering key to each cell phone in the communication network. The service provider keeps the corresponding enciphering key of each cell phone to encipher the plaintext access information of the network lock of each cell phone into ciphertext access information. Each cell phone keeps only the ciphertext access information and stores the corresponding deciphering key in a read only memory. When a cell phone proceeds with the verification of the network lock, the cell phone deciphers the ciphertext access information to plaintext access information according to the deciphering key of the cell phone, and implements the network lock mechanism according to the plaintext access information. Since the enciphering keys and deciphering keys of different cell phones are all different, even if illegal users are able to overwrite ciphertext access information of a cell phone with the ciphertext access information of other cell phone, or falsify the ciphertext access information of a cell phone directly, the cell phone can determine that the network lock is broken and prevent illegal access to the communication service. Therefore, the network lock mechanism is preserved and the security of the communication network is protected.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for determining whether a communication device is permitted to access communication service in a communication network, the communication device comprising:
   a data memory capable of storing ciphertext access information; and
   an inerasable memory capable of storing a deciphering key in a non-volatile way; and
   the method comprising:
      enciphering access information corresponding to the communication device into the ciphertext access information using a predetermined cryptography algorithm according to an enciphering key stored outside of the communication device, wherein the enciphering key corresponds to the deciphering key, and wherein the communication network comprises a service provider capable of providing communication service to the communication device; there being a database in the service provider for recording the enciphering key corresponding to the communication device; and
      recording the ciphertext access information in the data memory;
      reading the deciphering key in the inerasable memory and the ciphertext access information in the data memory; and
      deciphering the ciphertext access information to plaintext access information according to the deciphering key by using the cryptography algorithm, and determining whether the communication device is permitted to access communication service in the communication network accordingly.

2. The method of claim 1 wherein the cryptography algorithm is an asymmetric encryption-and-decryption algorithm.

3. The method of claim 1 wherein the data memory is a non-volatile memory.

4. The method of claim 1 further comprising:
   generating the enciphering key and the corresponding deciphering key according to the cryptography algorithm before generating the ciphertext access information according to the enciphering key.

5. The method of claim 1, wherein when generating the ciphertext access information according to the enciphering key, the service provider enciphers the access information corresponding to the communication device to generate the ciphertext access information according to the enciphering key stored in the database.

6. The method of claim 5, wherein when recording the ciphertext access information in the data memory, transmitting the ciphertext access information from the service provider to the communication device via the communication network, and recording the ciphertext access information in the data memory with the communication device.

7. The method of claim 1, wherein the enciphering key is different from the deciphering key.

8. The method of claim 1, wherein when determining whether the communication device is permitted to access communication service of the communication network according to the plaintext access information, determining whether the plaintext access information conforms to predetermined access information; the communication device being determined permitted to access the communication service of the communication network if the plaintext access information conforms to the predetermined access information.

9. The method of claim 1 in which the communication device further comprises a subscriber identification module card (SIM card) capable of recording a subscriber identification number, and a predetermined identification number is recorded in the plaintext access information, wherein when determining whether the communication device is permitted to access communication service in the communication network according to the plaintext access information, determining whether the subscriber identification code conforms to the predetermined identification code; the communication device being permitted to access the communication service if the predetermined identification code and the subscriber identification code correspond to each other, and the communication device being not permitted to access the communication service and having access to the communication network stopped if the predetermined identification code and the subscriber identification code do not correspond to each other.

10. A communication device utilized in a communication network for accessing communication service of the communication network; the communication device comprising:
    a data memory capable of storing ciphertext access information in a non-volatile way;
    an inerasable memory capable of storing a deciphering key in a non-volatile way; and
    a processor capable of controlling operation of the communication device;
    wherein before the communication device accesses the communication service of the communication network, the processor reads the deciphering key in the inerasable memory and the ciphertext access information in the data memory, utilizes a predetermined cryptography algorithm to decipher the ciphertext access information to plaintext access information according to the deciphering key, and determines whether the communication device is permitted to access communication service of the communication network according to plaintext access information;
    wherein the communication network comprises a service provider for providing communication service to the communication device; there being a database in the service provider capable of recording an enciphering key corresponding to the communication device, the enciphering key being stored outside of the communication device, the ciphertext access information being generated by enciphering the access information corresponding to the communication device by the cryptography algorithm according to the enciphering key, wherein the enciphering key corresponds to the deciphering key.

11. The communication device of claim 10 wherein the cryptography algorithm is an asymmetric encryption-and-decryption algorithm.

12. The communication device of claim 10 wherein the enciphering key and the corresponding deciphering key are generated according to the cryptography algorithm.

13. The communication device of claim 10 wherein the ciphertext access information is transmitted from the service provider to the communication device via the communication network, and recorded in the data memory by the communication device.

14. The communication device of claim 10 wherein when the processor determines whether the communication device is permitted to access communication service according to the plaintext access information, the processor determines whether the plaintext access information conforms to predetermined access information; wherein the processor determining the communication device is permitted to access the communication service if the plaintext access information conforms to the predetermined access information.

15. The communication device of claim 10 in which the communication device further comprises a SIM card capable of recording a subscriber identification number, and a predetermined identification code is recorded in the plaintext access information, wherein when the processor determines whether the communication device is permitted to access communication service according to the plaintext access information, the processor determines whether the subscriber identification code conforms to the predetermined identification code; the communication device being permitted to access the communication service if the predetermined identification code and the subscriber identification code correspond to each other, and the communication device being not permitted to access the communication service and access to the communication network being stopped if the predetermined identification code and the subscriber identification code do not correspond to each other.

16. The communication device of claim 10 in which the communication device is a cell phone, and the communication network is a wireless communication network.

17. A method applied in a communication network, wherein the communication network comprises a plurality of communication devices and each communication device comprises an inerasable memory and a data memory; the method being capable of determining whether each communication device is permitted to access communication service of the communication network; the method comprising:

providing a plurality of different enciphering keys and a plurality of deciphering keys according to a cryptography algorithm, wherein each enciphering key corresponds to each deciphering key, wherein the communication network further comprises a service provider capable of transmitting signals and providing communication service among communication devices, service provider having a database storing enciphering keys corresponding to each communication device in the database, the enciphering keys being stored outside of the respective communication devices;

providing different corresponding enciphering keys to different communication devices;

enciphering access information corresponding to each communication device to ciphertext access information by the cryptography algorithm according to the enciphering key corresponding to the communication device;

storing deciphering keys corresponding to the enciphering keys corresponding to each of the communication devices in the inerasable memory;

storing ciphertext access information of each communication device in the data memory of the communication device; and when determining whether a communication device is permitted to access the communication service, deciphering the ciphertext access information in the data memory by the cryptography algorithm according to the enciphering key stored in the inerasable memory, and determining whether the communication device is permitted to access the communication service according to the deciphered ciphertext access information.

18. The method of claim 17, wherein the deciphering keys corresponding to different enciphering keys are different.

19. The method of claim 17, wherein the cryptography algorithm is an asymmetric encryption-and-decryption algorithm such that an enciphering key is not equal to the corresponding deciphering key, and when a plaintext is enciphered into a ciphertext according to the enciphering key by the cryptography algorithm, the cryptography algorithm cannot decipher the ciphertext into the original plaintext according to the enciphering key.

20. The method of claim 17 in which the communication device is a cell phone, and the communication network is a wireless communication network.

* * * * *